C. T. PHILLIPS.
Grain Winnower.

No. 91,561.

Patented June 22, 1869.

Witnesses

Inventor

United States Patent Office.

C. T. PHILLIPS, OF JORDAN, NEW YORK.

Letters Patent No. 91,561, dated June 22, 1869.

---

IMPROVEMENT IN GRAIN-SEPARATORS.

---

The Schedule referred to in these Letters Patent and making part of the same.

---

*To all whom it may concern:*

Be it known that I, C. T. PHILLIPS, of Jordan, in the county of Onondaga, and State of New York, have invented an Improved Grain-Separator; and I do hereby declare that the following is a full, clear, and exact description thereof, which will enable those skilled in the art to make and use the same, reference being had to the accompanying drawings, forming part of this specification, in which—

Similar letters of reference indicate like parts.

This invention relates to certain new and useful improvements in separators for cleaning grain, whereby the work is done more efficiently than heretofore, as hereinafter explained.

In the accompanying drawings—

A $a\ a$ is a suction-blast fan, and

B $b$ is its shell, or case.

This fan is placed within the chamber C, and the air, in being drawn from the chamber, passes in at the centre A of the fan-casing, and is discharged at $b$; and the air that is thus drawn from the chamber C, is replaced by a flow of air upward through blast-spouts D D, and valves, or openings $d\ d$.

The rear side of the machine is provided with a series of legs, or vertical blast-spouts, D D$^1$ D$^2$ D$^3$ D$^4$, through which the grain falls successively, until it has passed through the whole series of legs, or spouts.

Figure 2:
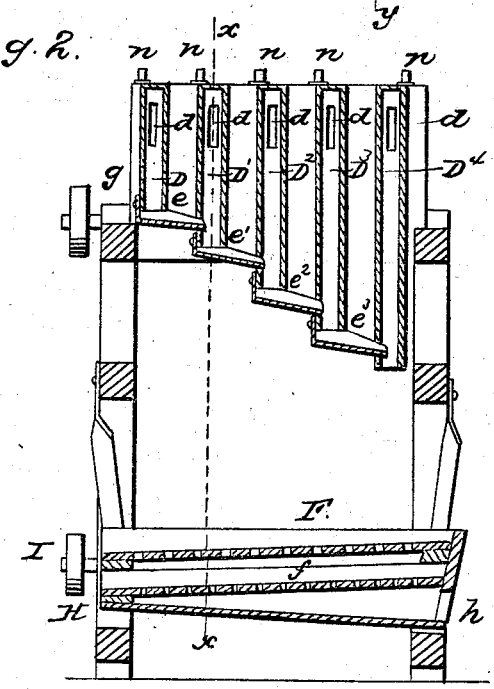
Figure 2 is a vertical cross-section, taken in the line $y\ y$ in fig. 1.

The grain passes into the first leg, or spout, D, by an opening, $g$, fig. 2, and falls through the spout into the chute $e$; and while falling through said spout, the upward blast of air through the spout removes a portion of the impurities from the grain.

The chute $e$ conveys the grain to the next spout D$^1$ of the series, where it again falls into the next chute $e^1$; and so the grain continues to fall through the several spouts, until it has reached spout D$^4$, or the last one of the series; and in falling through each spout, the grain is exposed to a strong blast of air, which is drawn upward through all of the spouts D.

As the grain leaves the spout D$^4$, it falls on to a vibrating screen, F, which separates the straws and coarse dirt; and the grain, passing through this screen, falls upon a finer one, $f$, and is discharged at H.

The fine screen $f$ separates cockle from the grain, and discharges it at $h$.

This screen F$f$ is vibrated horizontally by cam-rods $i$, connecting with a cam-shaft, I.

Figure 1:
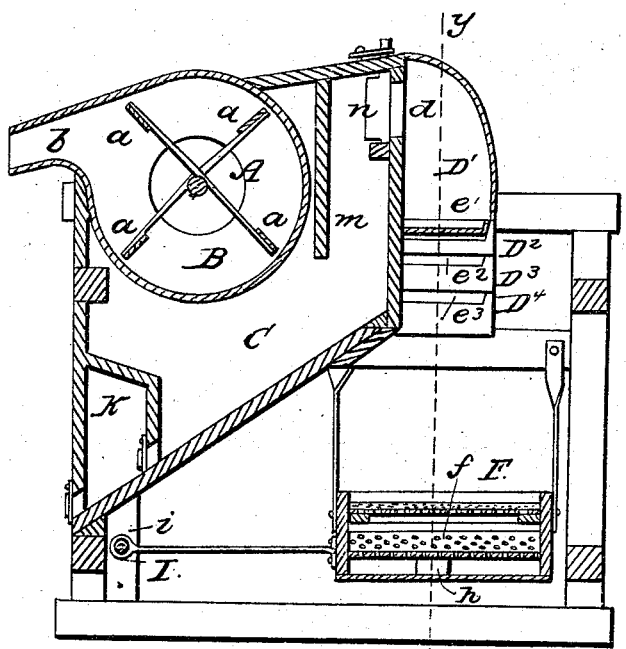
Figure 1 is a vertical longitudinal section, taken in the line $x\ x$ in fig. 2.

K, fig. 1, is a double-trap arrangement, for passing dirt, chess, &c., that is taken from the grain, out of the chamber C.

This dirt is thrown downward, so as to get below the influence of the fan, or draught, by a hanging partition, $m$, fig. 1, and then passes readily into the trap.

The strength of the blast through the legs D D, is regulated by valves $n$, which are capable of being set in a position to open or close the passages $d$, more or less.

By this construction, the grain is so thoroughly agitated, in passing through the several spouts and chutes D D $e\ e$, and at each agitation so exposed anew to the blast, that it is cleaned in a very perfect manner, and a very efficient and desirable separator is obtained.

I do not claim broadly a series of conductors through which the grain passes, and is subjected to the draught of a fan, as I am aware that this is shown in the patent of A. Schenck, dated December 3, 1867; but having thus described my invention,

What I claim as new, and desire to secure by Letters Patent, is—

1. The blast-fan A, chamber C K, hanging partition $m$, valve-openings $n\ d$, spouts D D, and chutes $e\ e$, and vibrating screen F $f$, all constructed and arranged substantially as and for the purpose herein set forth.

2. The series of vertical spouts D D$^1$ D$^2$ D$^3$ D$^4$, connected together by means of the chutes $e\ e^1\ e^2\ e^3$, when said spouts are made to communicate with a common fan-chamber, C, in the manner substantially as herein described, whereby a single fan is rendered sufficient for the entire series of spouts.

3. The combination and arrangement of the vertical spouts D D$^1$ D$^2$ D$^3$, connected together by chutes, the common chamber C, fan A $a$, and the swinging frame with screens F $f$, all constructed and arranged to operate substantially as described.

The above specification of my invention signed by me, this 9th day of April, 1869.

C. T. PHILLIPS.

Witnesses:
WM. J. DODGE,
F. A. MORLEY.